(12) United States Patent
Rodriguez et al.

(10) Patent No.: US 9,066,219 B2
(45) Date of Patent: Jun. 23, 2015

(54) HANDLING TERMINALS IN A NETWORK USING VAMOS TECHNOLOGY

(75) Inventors: David Valerdi Rodriguez, Madrid (ES); Kyriakos Exadaktylos, Madrid (ES)

(73) Assignee: VODAFONE GROUP PLC, Newbury, Berkshire (GB)

( * ) Notice: Subject to any disclaimer, the term of this patent is extended or adjusted under 35 U.S.C. 154(b) by 802 days.

(21) Appl. No.: 13/294,055

(22) Filed: Nov. 10, 2011

(65) Prior Publication Data

US 2012/0207042 A1  Aug. 16, 2012

(30) Foreign Application Priority Data

Nov. 10, 2010 (ES) .................................. 201031654

(51) Int. Cl.
| | |
|---|---|
| H04L 12/28 | (2006.01) |
| H04W 8/22 | (2009.01) |
| H04W 24/06 | (2009.01) |
| H04J 1/16 | (2006.01) |
| H04W 72/08 | (2009.01) |

(52) U.S. Cl.
CPC ................ *H04W 8/22* (2013.01); *H04W 24/06* (2013.01); *H04W 72/085* (2013.01)

(58) Field of Classification Search
USPC .................................. 370/252, 442, 347, 278
See application file for complete search history.

(56) References Cited

U.S. PATENT DOCUMENTS

| | | | | |
|---|---|---|---|---|
| 7,460,862 | B2 * | 12/2008 | Pasanen et al. | 455/418 |
| 2011/0051650 | A1 * | 3/2011 | Winstok et al. | 370/312 |
| 2011/0082689 | A1 * | 4/2011 | Juncker et al. | 704/201 |
| 2013/0281101 | A1 * | 10/2013 | Yu et al. | 455/450 |
| 2014/0369309 | A1 * | 12/2014 | Yu | 370/329 |

FOREIGN PATENT DOCUMENTS

WO  WO2010/127239  11/2010

OTHER PUBLICATIONS

EP Search Report dated Feb. 8, 2012 for EP11275140.9-2414.

* cited by examiner

*Primary Examiner* — John Pezzlo
(74) *Attorney, Agent, or Firm* — Workman Nydegger

(57) ABSTRACT

Method for handling terminals in a network using VAMOS technology which performs a "virtual" pairing of the terminal with a simulated call. The method comprises the steps of generating a VAMOS support database with terminal information of terminals in the network; checking in the VAMOS support database for an entry corresponding to terminal information of a given terminal; if no entry is found in the VAMOS support database, pairing the terminal with a simulated call, launched by the network, in a VAMOS channel; measuring at least one indicator parameter of the terminal during the pairing with the simulated call; assigning an entry in the VAMOS support database indicating the applicability of the terminal with VAMOS technology; and allowing VAMOS channelization for the terminal in dependence upon the entry corresponding to the given terminal.

14 Claims, 4 Drawing Sheets

HANDLING TERMINALS IN A NETWORK USING VAMOS TECHNOLOGY

CROSS-REFERENCE TO RELATED APPLICATIONS

This Application claims priority to and the benefit of Spanish Patent Application No. ES P201031654, filed Nov. 10, 2010, which is incorporated herein by reference in its entirety.

DESCRIPTION

1. Technical Field of the Invention

The present invention relates to the technical field of radio based communications and more specifically to terminals working in a network using VAMOS technology.

2. Background of the Invention

VAMOS Technology, "Voice service over Adaptive Multi-User channels on One Slot", is a technology that addresses the increasing number of people using GSM and allows doubling current GSM Radio HW capacity, by enabling 4 simultaneous calls in one single GSM time slot. This technology is being defined GERAN (3GGP) and it can be used not only for GSM technology but also for other types of wireless networks.

Specifically, the VAMOS technology constructs a multiple-input system in the uplink (typically formed by two terminals) and the base station (BTS) receives both signals within the same RF (i.e. same frequency and time slot) and is able to differentiate them through post processing receiver capabilities. In downlink, multiple users' data are transmitted with higher-order modulation mode (i.e. QPSK type modulation), and each terminal discriminates its own signal in a specific way. QPSK is very well known modulation type in the Industry. It is defined as a GSM modulation by the 3GPP specification TS 45-004, chapter 5.

In theory, VAMOS can double voice capacity (or even more because of statistical gain) with no impact on a significant amount of legacy handsets (SAIC capable) and reduced impact over networks.

Another innovation introduced by this technology is the incorporation of a new set of training sequence codes (TSC) with low cross-correlation to work in combination with already existing training sequences, enabling a better separation of sub channels of VAMOS mode. A new type of terminals able to support this alternative set of TSCs has been termed "VAMOS terminal", however not all terminals supporting VAMOS functionality are able to support this alternative set of TSCs (i.e. not all the terminals supporting VAMOS functionality are "VAMOS terminal"). For further information about VAMOS technology refer to 3GPP specification TS 45-001, chapter 13.

Alpha-QSPK is a QPSK (modulations that has quaternary constellations) type modulation specified in VAMOS standard that is used in the downlink. Alpha parameter ($0 \leq \alpha \leq \sqrt{2}$) determines the cross power ratio between the I and Q branches (in the constellation). FIG. 1 depicts the case with $\alpha=0.6$, the energy of the alpha-QPSK constellation is always 1, independent of $\alpha$.

The extreme values $\alpha=0$ and $\alpha=\sqrt{2}$ yield BPSK constellations, while for $\alpha=1$ an ordinary QPSK constellation is obtained.

Whenever two terminals are paired in a VAMOS channel, one of the terminals energy is represented in the I branch and the other one in the Q branch. Alpha determines how the energy provided by the BTS to the terminals is shared between them. For instance, if "terminal 1" is in worse radio conditions than "terminal 2", more energy will be served for "terminal 1" than to "terminal 2" and alpha will be set, accordingly. That is to say, alpha varies depending of relative radio conditions of the two terminals involved in the VAMOS channel.

For further information about Alpha-QPSK modulation and figures, constellations . . . check 3GPP Specification TS-45004, chapter 6 and TR-45914 (3GPP GERAN).

VAMOS feature interoperates with SAIC ("Single Antenna Interference Cancellation") terminals, which show a current global penetration of around 40%, expecting to increase by 75% in 2011/12 timeframe. SAIC is an interference mitigation technique generally implemented in the mobile station receivers. SAIC refers to a type of processing algorithms, which attempt to cancel or suppress interference using a single receiving antenna.

Terminals supporting SAIC have to fulfill requirements specified in the GERAN (3GPP) within Downlink Advanced Receiver Performance (DARP) specifications, which comprise:

New receiver reference performance tables for SAIC-capable terminals for potentially all voice and data services.

New test setups including combined interference environments including co- and adjacent channel interference and associated performance requirements.

New signalling methods defined to enable a handset to inform the network about its SAIC capabilities (DARP signalling).

However, certain terminals (old and new ones), though SAIC capable, do not report this capability to the network during the call set up (i.e. they do not support DARP signalling, specified by the GERAN). They are called "Mute SAIC", and the impact on VAMOS means reducing the applicability of this technology since this type of terminals is not considered as candidates for VAMOS pairing.

AFC "Automatic Frequency Correction" is a set of proprietary algorithms implemented in the terminals that, basically, work as follows:

AFC tracks the frequency (Frequency is the one used by transport channel involved in the communication) according to the bursts received from network side.

If a frequency shift is discovered, the local oscillator is adjusted to correct the frequency shift, so that it can be align with the network frequency.

When alpha-QPSK modulation is used (standard one), some terminals had adopted a very restrictive AFC "Automatic Frequency Correction" that makes the terminal discard samples SNR<0 hence losing synchronization with the base station BTS which results to a drop call.

Signal-to-noise ratio (also written as SNR) compares the level of a desired signal to the level of noise. The higher the ratio, the less obtrusive the background noise is.

$$SNR_{dB} = 10\log_{10}\left(\frac{P_{signal}}{P_{noise}}\right) = P_{signal,dB} - P_{noise,dB},$$

In VAMOS, the main contribution to noise is likely to be coming from the other terminal in the same pair. This interference is included in Pnoise,dB term. If PnoisedB>Psignal,dB, there will be negative values, so samples with SNR<0 are common under VAMOS technology.

The AFC algorithms of these terminals work only when the SNR of the received bursts is greater than a designated threshold, and they become extremely ineffective when operating alongside Alpha-QPSK modulation under VAMOS technology, since received bursts are continuously being interfered by the pairing terminal which results in low SNR, and the problem become severely when alpha setting is negative for these terminals.

Consequently, the AFC implementation for these terminals takes no action (because SNR is too low) and the drift of oscillator eventually incurs a sizeable frequency shift which is beyond the equalizer capability of the handset, and call drop will be observed at last, after continuous downlink. In this case the frequency mentioned is that used by a given transport channel involved in the communication.

Although it depends on terminal implementation, in general, a terminal tolerates a frequency shift of ~500 Hz (above the call is dropped since it is out of equalizer range). Above 200 Hz frequency shift, the received signal quality starts to be impacted.

Received signal quality is known as RxQual, which is a standard parameter defined in 3GPP TS 04.18. RxQual is used in GSM and is a part of the Network Measurement Reports. This is an integer which value can be between 0 and 7 and reflects the quality of voice. 0 is the best quality, 7 is the worst.

Consequently, a huge amount of terminals do not take advantage from the VAMOS technology improvements, because they are not considered candidates (mute-SAIC) or their performance when VAMOS technology is used is very poor (restrictive AFC). Capacity efficiency enhancement step (obtained with VAMOS) is key to face voice traffic explosion in emerging markets and wireless bands (as GSM band) refarming scenarios in mature markets. However, the applicability of VAMOS technology is affected by the issues depicted before.

SUMMARY OF THE INVENTION

The invention described on this paper aims to solve the aforementioned problems by disclosing in a first aspect a method for handling terminals which performs a "virtual" pairing of the terminal with a simulated call, launched by the network, in a VAMOS channel in order to obtain information about the behaviour of the terminal in this situation.

Preferably, the method for handling terminals in a network using VAMOS technology comprises the steps of:
  generating a VAMOS support database with terminal information of terminals in the network;
  checking in the VAMOS support database for an entry corresponding to terminal information of a given terminal;
  if no entry is found in the VAMOS support database, pairing the terminal with a simulated call, launched by the network, in a VAMOS channel;
  measuring at least one indicator parameter of the terminal during the pairing with the simulated call;
  assigning an entry in the VAMOS support database indicating the applicability of the terminal with VAMOS technology depending on the result of measuring the at least one indicator parameter;
  and allowing VAMOS channelization for the terminal in dependence upon the entry corresponding to the given terminal.

Thus, when a VAMOS channelization is requested and an entry corresponding to the terminal is found in the VAMOS support database, it is not necessary repeating this kind of diagnosis, but directly the VAMOS channelization is allowed. Otherwise, it is done a virtual test to make a diagnosis of the applicability of the terminal. The virtual test is a pairing, as it is defined in VAMOS standard, between the terminal in diagnosis and a simulated call instead a real terminal. This is a simulation of a VAMOS channel that the network launches in the downlink, just to create the proper conditions to make the test.

The at least one indicator parameter to be measured, may be a value of received signal quality, which is included in a measurement report that the terminal sends to the network during a call. Said value of received signal quality is compared with a threshold in order to detect if the terminal is robust enough, in a virtual VAMOS channel. This is done because non-SAIC capable terminals suffer from a sudden degradation on the RxQual when VAMOS paired, while SAIC capable terminals are robust enough in a VAMOS channel. This degradation on non-SAIC terminals is so sudden that the user does not perceive anything, so the network has enough time to perform this VAMOS virtual channelization without user experience impact.

If the value of received signal quality is lower than the threshold indicating that the terminal belongs to a group of terminals which do not report to the network a single antenna interference cancellation capability (because they do not support DARP signalling), the entry assigned to the terminal allows a VAMOS channelization. These terminals are defined as Mute-SAIC.

The at least one indicator parameter to be measured, may be a value of frequency shift, which is included in a measurement report that the terminal sends to the network during a call. Said value of frequency shift is compared with a threshold in order to detect a very restrictive AFC. If this indicator parameter increases, it means that AFC is not properly functioning and may be working with a designated threshold for SNR, becoming extremely ineffective when cooperated with alpha-QPSK modulation since it is continuously being interfered by the pairing terminal which results in low SNR. The problem becomes even worse when alpha values are negative for these terminals.

The present invention also disclosed a method to apply countermeasures in the case a restrictive AFC terminal is detected, in order to improve the behaviour of these terminals when VAMOS channelization is applied.

Preferably, if the value of frequency shift is greater than the threshold indicating that the terminal belongs to a group of terminals which have adopted an automatic frequency correction as restrictive as to drop a call due to discarding samples when signal-noise-ratio is lower than 0, further comprising, if pairing the terminal with a VAMOS terminal and there is a served energy relative difference between the terminals within a first predetermined range, interleaving alpha values dynamically set that derive in an increase of the energy, being alpha the parameter which determines how the energy provided by a base station to the two terminals is shared between them, and changing the frequency of interleaved alphas according to actual received signal quality conditions. The alpha value use to be the alpha parameter of the alpha-QPSK modulation.

Thus, interleaving alpha values is a countermeasure for the issue of restrictive AFC, and the entry assigned to corresponding terminal is linked to this countermeasure and allows a VAMOS channelization.

If the pairing is made with a SAIC capable, non VAMOS terminal, the alpha value is set to 1.

Preferably, the terminal information is the Type Allocation Code, which is the initial eight-digit portion of the 15-digit International Mobile Equipment Identity code used to uniquely identify wireless devices. The International Mobile Equipment Identity is reported by the terminals during a call set up and the Type Allocation Code is included. Type Allocation Code identifies a particular model of wireless telephone for use on a GSM, UMTS or other IMEI-supporting wireless network, so records of each model in the network are stored since all terminals of the same model have the same problem.

Preferably, pairing the terminal with a simulated call, launched by the network, in a VAMOS channel, for measuring at least one indicator parameter of the terminal during the pairing with the simulated terminal, is performed by the network if the scenario is suitable, according to network conditions, frequency shift, traffic load and received signal quality, set previously. These actions take place, as the application of countermeasures, when the parameters allow minimizing user experience impact and so that they are properly parameterized.

Preferably, the first predetermined range is [−8, 1]dB.

The energy distributed between two terminals paired using QPSK modulation is the same for both of them. In turn, restrictive AFC terminals do not work in the range of [−8,−1]dB when paired with other commercial SAIC handsets (those not experiencing the issue) and in [−8, 1]dB when paired with VAMOS terminals. It is in this last case when alpha values are interleaved to derive a higher energy for the restrictive AFC terminal within a range of [2,8]dB between the terminals. The preferred embodiments would be 4 dB in order to avoid harming the other terminal (VAMOS Terminal) too much.

One of the advantages of the VAMOS support database comprises applying directly related countermeasure, which is stored in the database linked to the result of the identification of target terminals, when the terminal model is found checking the database. Being "target terminals" those which a countermeasure is applied, to benefit the use of VAMOS technology, because their performance under VAMOS technology is not. The objective is to avoid repeating the process of the virtual test for the same model.

Additionally, the database can be used to take some decisions from the network side. For instance, VAMOS is used to enhance capacity in the radio interface increasing radio resource efficiency. When a capacity increase is not needed, target terminals are discarded for VAMOS technology and just considered the optimum ones. Applying these countermeasures and solutions increase the number of terminals candidates for VAMOS application, thus increasing VAMOS applicability in the network. Increasing VAMOS applicability means leveraging VAMOS benefits (capacity efficiency increase and all related benefits for the network).

There are actually more countermeasures that can be carry out when terminals identified as SAIC capable present negative behaviours in the parameters studied, but they are solutions to study for each particular case.

According to another aspect of the invention, a system is provided for handling terminals in a network using VAMOS technology, the system comprises:
- a VAMOS support database to store terminal information and entries indicating applicability of VAMOS technology and countermeasures if any;
- a network element configured to:
  - check in the VAMOS support database for an entry corresponding to terminal information of a given terminal;
  - pair the terminal with a simulated call, launched by the network, in a VAMOS channel;
  - measure at least one indicator parameter of the terminal during the pairing with the simulated call;
  - assign an entry in the VAMOS support database indicating the applicability of the terminal with VAMOS technology depending on the result of measuring the at least one indicator parameter;
  - allow VAMOS channelization for the terminal in dependence upon the entry corresponding to the given terminal.

Preferably, the VAMOS support database is hosted in an access node as a base station controller, but in other embodiment of the invention the VAMOS support database is hosted in a node of the network and switching system as for example the mobile switching central MSC or the VLR, HLR . . . .

Consequently, according to the invention, a system, method and computer program according to the independent claims are provided. Favourable embodiments are defined in the dependent claims.

The above features and advantages do not limit the present invention, and those skilled in the art will recognize additional features and advantages upon reading the following detailed description, and upon viewing the accompanying drawings.

DESCRIPTION OF THE DRAWINGS

To complement the description which is being made and for the purpose of aiding to better understand the features of the invention according to a preferred practical embodiment thereof, a drawing is attached as an integral part of this description, in which the following has been depicted with an illustrative and non-limiting character.

DETAILED DESCRIPTION OF THE INVENTION

Figure 1:
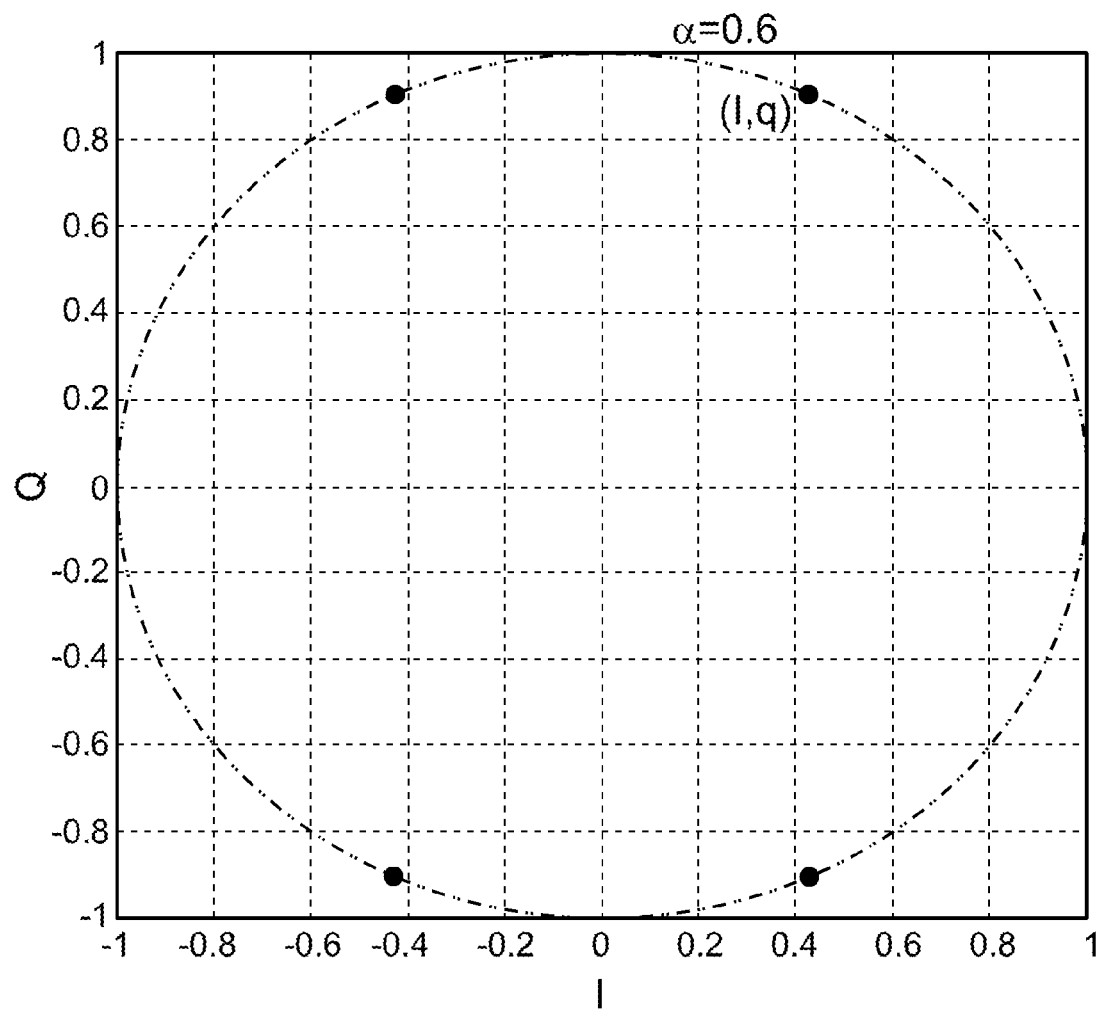
FIG. 1 shows an example of an Alpha-QPSK modulation constellation (with α=0.6).
Figure 2:
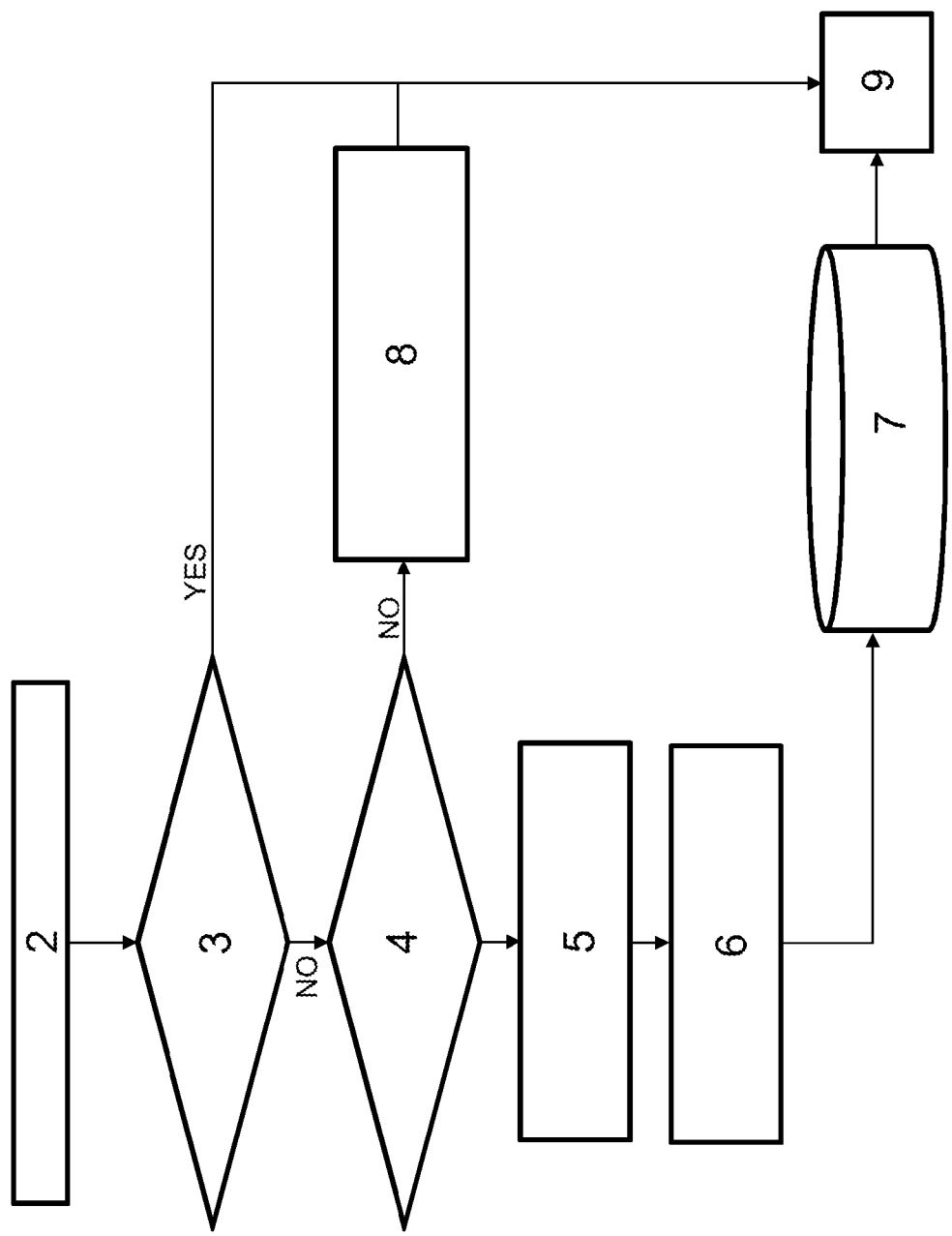
FIG. 2 shows a block diagram illustrating the steps of the target terminals identification.
Figure 3:
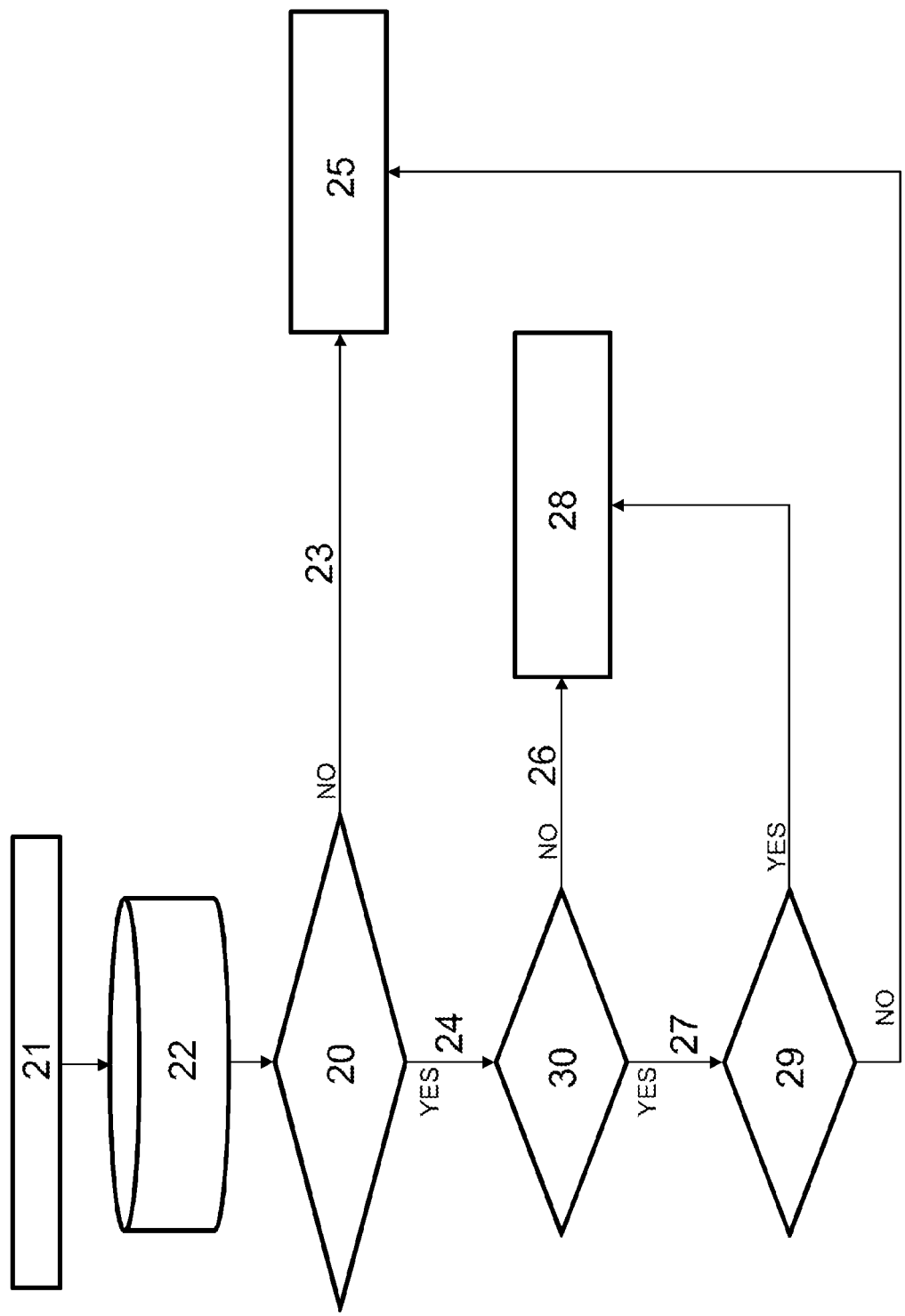
FIG. 3 shows a block diagram illustrating the steps carried out to apply countermeasures in the case of the target terminal have been identified as SAIC capable.
Figure 4:
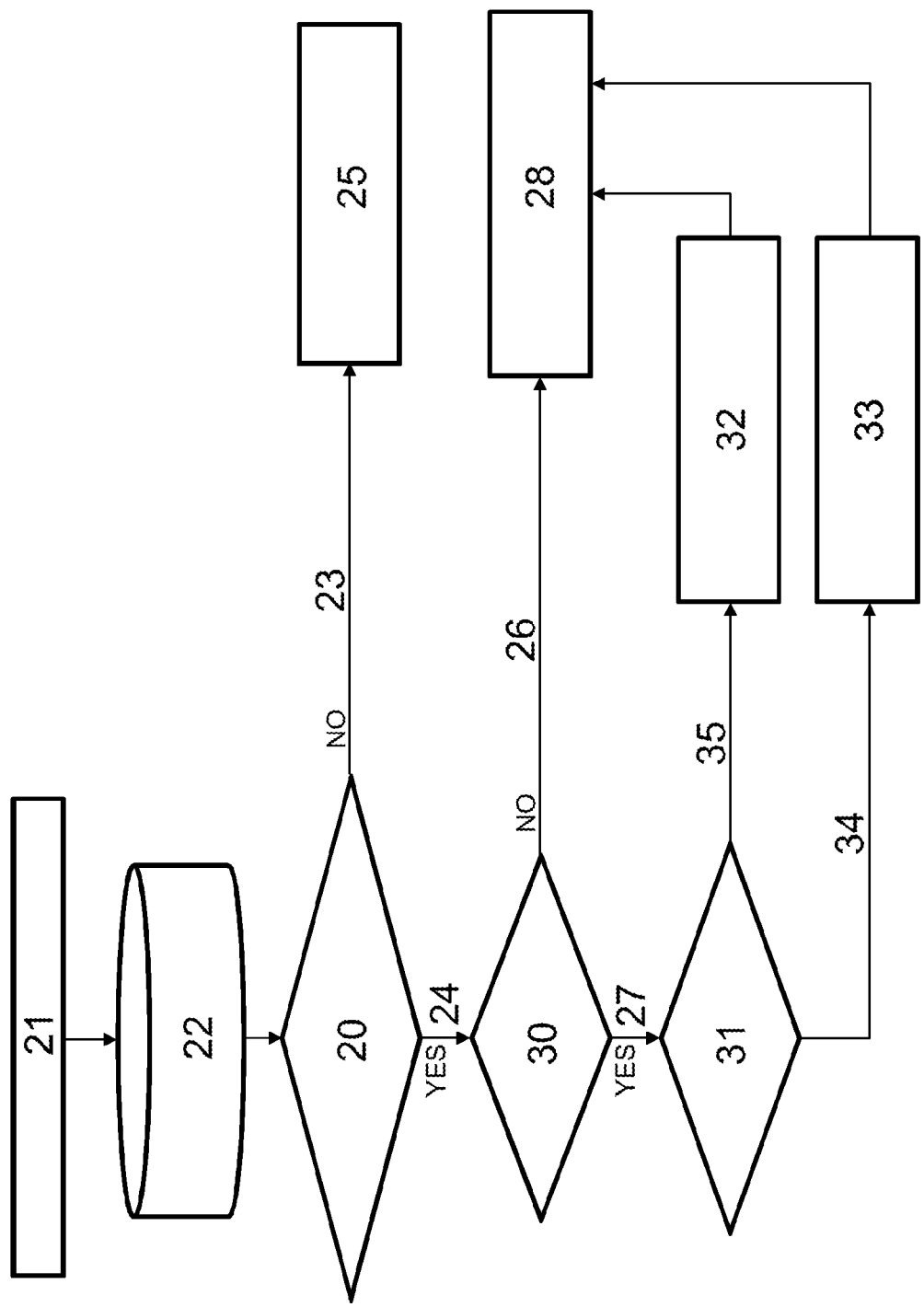
FIG. 4 shows a block diagram illustrating the steps carried out to apply countermeasures in the case of the target terminal have been identified with a restrictive AFC.

Here below a practical implementation in accordance to an embodiment of the invention is described.

The method proposed consists of solutions for the issues already depicted of:
"Mute SAIC": certain terminals SAIC capable do not report this capability to the network during the call set up, because they do not support DARP signalling, so this type of terminals are not considered by the system as candidates for VAMOS pairing.
"Restrictive AFC": when alpha-QPSK modulation is used, some terminals adopt a very restrictive AFC "Automatic Frequency Correction" that makes the terminal discard samples SNR<0 losing synchronization with the BTS which results to a drop call. Samples with SNR<0 are common under VAMOS scenarios.

The solutions normally cover two main steps:
Identification of target terminals
Countermeasures application Being "target terminals" those to which a countermeasure is applied to allow an optimum using of VAMOS technology. The core innovation of the invention occurs transversally both in these two steps, where the identification and countermeasures are applied taking into account network conditions as radio conditions, traffic load, some parameters as RxQual or Frequency shift, in order to minimize user experience impact and properly parameterize these two steps increasing effectiveness. Thus, virtual tests performed for the identification of target terminals are performed when network conditions allow minimizing user experience impact and countermeasure is also parameterized according to these conditions with the same objective.

Identification of Target Terminals

First thing is sending the terminal capability information (2) to the network. Then a database is checked (3) to find out if the terminal involved is a target one and, in that case, directly applying the related countermeasure. The objective of this database is avoiding the repetition of this process of identification for the same terminal models.

If the database does not contain information about the terminal involved, it must be identified whether the terminal is a target terminal or not. The identification is performed by applying virtual VAMOS channels to terminals during a short period of time (in order to avoid any impact to the customer). So, before starting a VAMOS channelization it is checked if the scenario is suitable (4) taking into account time of the day, radio conditions RxQual and Frequency shift, and traffic load. In the case that the parameterization allows the VAMOS channelization the pairing (5) starts. Otherwise VAMOS channelization is not performed (8).

Virtual VAMOS channels is a virtual pairing, instead a real call, between the terminal where the diagnosis is performed and a simulated call launched by the network, so actually there is not other terminal involved in the pairing. Next step comprises measuring (6) indicator parameters which terminals normally report to the network, RxQual and frequency shift. Then, identifying the terminal as target terminals or not by comparing the values measured with a threshold and finally storing (7) the result of the identification in the database, which is updated. Thus, the process ends (9).

Once the VAMOS virtual channelization is performed, some indicator parameters that terminals send trough measurements reports to the network are measured depending on the issue type:

For "Mute SAIC" detection, RxQual is measured.
Non-SAIC handsets suffer from a sudden degradation on the RxQual when VAMOS paired, while Mute SAIC is robust enough in a VAMOS channel.
This degradation on non-SAIC handsets is so sudden that user does not perceive anything, so the network has enough time to perform this VAMOS virtual channelization without user experience impact.

For "Restrictive AFC" detection, both RxQual and Frequency Shift are measured.
Depending on alpha values (this issue happens when less energy is served for the target terminals), target terminals suffer from a sudden RxQual degradation. On the other hand, Frequency shift increases since AFC is working. A better indicator parameter is frequency shift, in this case, since it is a precursor of RxQual sudden degradation, though RxQual may also be used.

Countermeasures Application

The process of applying countermeasures works as follows. First, the network identify (21) a terminal as candidate for VAMOS channelization. After that, a search (22) is made in the database looking for the result of the identification done before. It is checked (20) if the result of the identification is stored (24) or not (23). If it is not stored (23), no identification of the terminal has been able to be done so VAMOS channelization is not allow (25) for that terminal and no countermeasure is applied. Otherwise, if the result of the identification is stored (24) in the database the next step is checking (30) if the terminal is a target one (27) or not (26). If the database have not stored the terminal as a target one, then VAMOS channelization is allowed (28) for this terminal. Otherwise, the application of countermeasures is needed, but it depends on the issue of the target terminal identified:

"Mute SAIC" (29)
It is an identification of a terminal which does not report its SAIC capability by itself, so the process finishes reporting that the terminal is SAIC capable including an entry in the VAMOS support database allowing VAMOS channelization (28).
However, there is an extensive variety of terminals, so, if any specific negative behaviour of RxQual is found out in a group of "Mute SAIC" terminals, some specific countermeasures can be applied after diagnosis, for instance, increasing the served energy to the terminal involved.

"Restrictive AFC" (31)
This issue has two cases depending on the real pairing:
i. The "Restrictive AFC" SAIC capable terminal is going to be paired with a SAIC capable (35) (but not VAMOS terminal) SAIC capable terminals work only within a range of served energy relative difference [−8,8]dB. In this case the alpha values derive in a served energy relative (ratio to power) difference between "Restrictive AFC" and SAIC capable of [−8, −1]dB. Restrictive AFC terminals are not working in that range.
The countermeasure consists on setting alpha=1 (32), that derives in a QPSK modulation. This is to say that the same energy is served for each of the terminals involved minimizing the likelihood of having AFC stopped in "Restrictive AFC".
ii. The "Restrictive AFC" SAIC capable terminal is going to be paired with a VAMOS terminal (34) (able to support an alternative set of training sequences codes introduces for VAMOS technology)
SAIC capable terminals work only within a range of [−8,8]dB. In this case even more energy is served to "Restrictive AFC": [−8,1 ]dB.
The countermeasure for this issue is to interleave alpha values (33) that derive in [2,8]dB relative energy difference for the "Restrictive AFC", regardless the radio conditions that alpha values should normally set according to. The preferred embodiment would be around 4 dB in order to avoid harming the other terminal (VAMOS Terminal).
This solution has two parameters: value of the alpha and frequency of interleaved alpha, related to the time between interleaved alphas. The invention acts on these parameters as follows:
Positive interleaved relative energy alpha values are dynamically set by basing on actual radio conditions in order to minimise the impact of the countermeasure for the "VAMOS terminal".
In the same way, frequency of interleaved alpha can be changed in terms of radio conditions.
EXAMPLE: If "Restrictive AFC" is under good radio conditions, less relative energy gain needs during the interleaved alpha and lower alpha interleaving frequency needs. Invention implemented in the network sets these parameters accordingly.

An example of the interleaving is included in the following table:

| | | Burst Number | | | |
|---|---|---|---|---|---|
| | ... n | n + 1 | ... n + 8 | n + 9 | ... |
| User 1 | ... QPSK | SCPIR_i | ... QPSK | SCPIR_j | ... |
| User 2 | ... QPSK | − SCPIR_i | ... QPSK | − SCPIR_j | ... |

User 1 is a "Restrictive AFC" terminal and User 2 is a VAMOS terminal (New TSC). QPSK modulation (SCPIR = 0).
SCPIR parameter is defined below.

The ratio of power (or served energy relative difference) between the Q and I channels (paired terminals) is defined as the Subchannel Power Imbalance Ratio, or SCPIR, where users in VAMOS are multiplexed in Q and I channels. Thus, it provides an idea on how the power is shared between the users in the same pair.

The value in an alpha QPSK modulation of the SCPIR is given by $$SCPIR = 20 \times \log_{10} (\tan(\alpha)) dB$$

The value of α shall be chosen such that
|SCPIR|≤10 dB but, as it is said before, in practical terms commercial terminals only can work within [−8,8]dB Commercial SAIC capable terminals work within a range of [−8,8]dB. In the spec 3GPP TS-45004, chapter 6, [−10,10] dB range is specified, but in practical terms, commercial terminals only can work within [−8,8]dB.

This table summarises the type of terminal and the actions/countermeasures to take for allowing VAMOS channelization:

| Group of terminals | Type of terminals | VAMOS allowed? | Action/Countermeasure |
|---|---|---|---|
| Legacy Terminals (i.e. all commercial terminals but VAMOS ones) | SAIC Terminals | YES | No action (optionally could be added in the database) |
| | Non SAIC | NO | No action (optionally could be added in the database) |
| | Mute SAIC | YES | Add in the database |
| | Restrictive AFC | YES | Add in the database. If paired with VAMOS Terminal, alpha must be interleaved. If paired with a SAIC terminal, alpha = 1 (normal QPSK) |
| VAMOS terminals | N/A | YES | No action (optionally could be added in the database) |

Additionally, the database can be used to take some decisions from the network side. For instance, VAMOS is used to enhance capacity in the radio interface increasing radio resource efficiency. There might be scenario where a capacity increase is not needed because, for example, low traffic conditions, so the network may intelligently decide to avoid using these problematic terminals for VAMOS technology and just consider the optimum ones.

This invention solves these issues related to terminals that may put in risk VAMOS applicability The matters defined in this detailed description are provided to assist in a comprehensive understanding of the invention. Accordingly, those of ordinary skill in the art will recognize that variation changes and modifications of the embodiments described herein can be made without departing from the scope of the invention. Also, description of well-known functions and elements are omitted for clarity and conciseness.

In the claims, the word "comprising" does not exclude other elements or steps, and the indefinite article "a" or "an" does not exclude a plurality.

The invention claimed is:

1. A method for handling terminals in a network using VAMOS technology, the method comprises the following steps:
   generating a VAMOS support database with terminal information of terminals in the network;
   checking in the VAMOS support database for an entry corresponding to terminal information of a given terminal;
   if no entry is found in the VAMOS support database, pairing the terminal with a simulated call, launched by the network, in a VAMOS channel;
   measuring at least one indicator parameter of the terminal during the pairing with the simulated call, comprising:
      measuring the value of frequency shift, which is included in a measurement report that the terminal sends to the network during a call; and
      comparing the value of the frequency shift with a threshold;
   assigning an entry in the VAMOS support database indicating the applicability of the terminal with VAMOS technology depending on the result of measuring the at least one indicator parameter; and
   allowing VAMOS channelization for the terminal in dependence upon the entry corresponding to the given terminal.

2. The method of claim 1 wherein measuring the at least one indicator parameter further comprising measuring a value of received signal quality, which is included in a measurement report that the terminal sends to the network during a call, and comparing the value of received signal quality with a threshold.

3. The method of claim 2 wherein if the value of received signal quality is lower than a certain threshold, the terminal is considered to have the single antenna interference cancellation capability and the entry assigned to the terminal allows a VAMOS channelization.

4. The method of claim 1 wherein, if the value of frequency shift is greater than a certain threshold, the terminal is considered to belong to a group of terminals which have adopted an automatic frequency correction as restrictive as to drop a call due to discarding samples when signal-noise-ratio is lower than 0.

5. The method of claim 4 where if the value of frequency shift is greater than said certain threshold, further comprising:
   if pairing the terminal with a VAMOS terminal, a terminal supporting new set of training sequence codes (TSC) with low cross-correlation, and there is a served energy relative difference between the terminals within a first predetermined range, interleaving alpha values dynamically that derive in an increase of the energy served to the first terminal, being alpha the parameter which determines how the energy provided by a base station to the two paired terminals is shared between them and
   changing the frequency of interleaved alphas according to actual received signal quality conditions.

6. The method of claim 5 where if the value of frequency shift is greater than said certain threshold, further comprising:

if pairing the terminal with a terminal SAIC capable but not supporting new set of training sequence codes (TSC) with low cross-correlation, non VAMOS terminal, the alpha parameter is set to 1.

7. The method of claim 5 where the alpha parameter is the alpha parameter used in the alpha-QPSK modulation used for the VAMOS channelization.

8. The method of claim 5 wherein interleaving alpha values is stored in the VAMOS support database as an entry determining a countermeasure to take in order to allow a VAMOS channelization for the terminal.

9. The method of claim 1 wherein, before the pairing with a simulated call, it is checked if the scenario is suitable according to network conditions and/or time of the day and/or traffic load and/or received signal quality and/or frequency shift and if the scenario is suitable, the step of pairing the terminal with a simulated call is performed and otherwise VAMOS channelization is not performed.

10. The method of claim 1 wherein terminal information is the Type Allocation Code, which is the initial eight-digit portion of the 15-digit International Mobile Equipment Identity code used to uniquely identify wireless devices.

11. A system for handling terminals in a network using VAMOS technology, the system comprises:
  a VAMOS support database to store terminal information and entries indicating applicability of VAMOS technology; and
  a network element configured to:
    check in the VAMOS support database for an entry corresponding to terminal information of a given terminal;
    pair the terminal with a simulated call, launched by the network, in a VAMOS channel;
    measure at least one indicator parameter of the terminal during the pairing with the simulated call, by:
      measuring the value of frequency shift, which is included in a measurement report that the terminal sends to the network during a call; and
      comparing the value of the frequency shift with a threshold;
    assign an entry in the VAMOS support database indicating the applicability of the terminal with VAMOS technology depending on the result of measuring the at least one indicator parameter; and
    allow VAMOS channelization for the terminal in dependence upon the entry corresponding to the given terminal.

12. The system of claim 11 wherein the VAMOS support database is hosted in the access network node or in a node of the network and switching system.

13. The system of claim 11 where the network element is an access network node.

14. A memory storage device on which is stored computer program code adapted to perform a method when said program is run on a computer, a digital signal processor, a field-programmable gate array, an application-specific integrated circuit, a micro-processor, a micro-controller, or any other form of programmable hardware, the method comprising:
  generating a VAMOS support database with terminal information of terminals in a network;
  checking in the VAMOS support database for an entry corresponding to terminal information of a given terminal;
  if no entry is found in the VAMOS support database, pairing the terminal with a simulated call, launched by the network, in a VAMOS channel;
  measuring at least one indicator parameter of the terminal during the pairing with the simulated call, comprising:
    measuring the value of frequency shift, which is included in a measurement report that the terminal sends to the network during a call; and
    comparing the value of the frequency shift with a threshold;
  assigning an entry in the VAMOS support database indicating the applicability of the terminal with VAMOS technology depending on the result of measuring the at least one indicator parameter; and
  allowing VAMOS channelization for the terminal in dependence upon the entry corresponding to the given terminal.

* * * * *